June 30, 1936.   E. OSE   2,046,206
TRAILER
Filed May 21, 1934   4 Sheets-Sheet 1
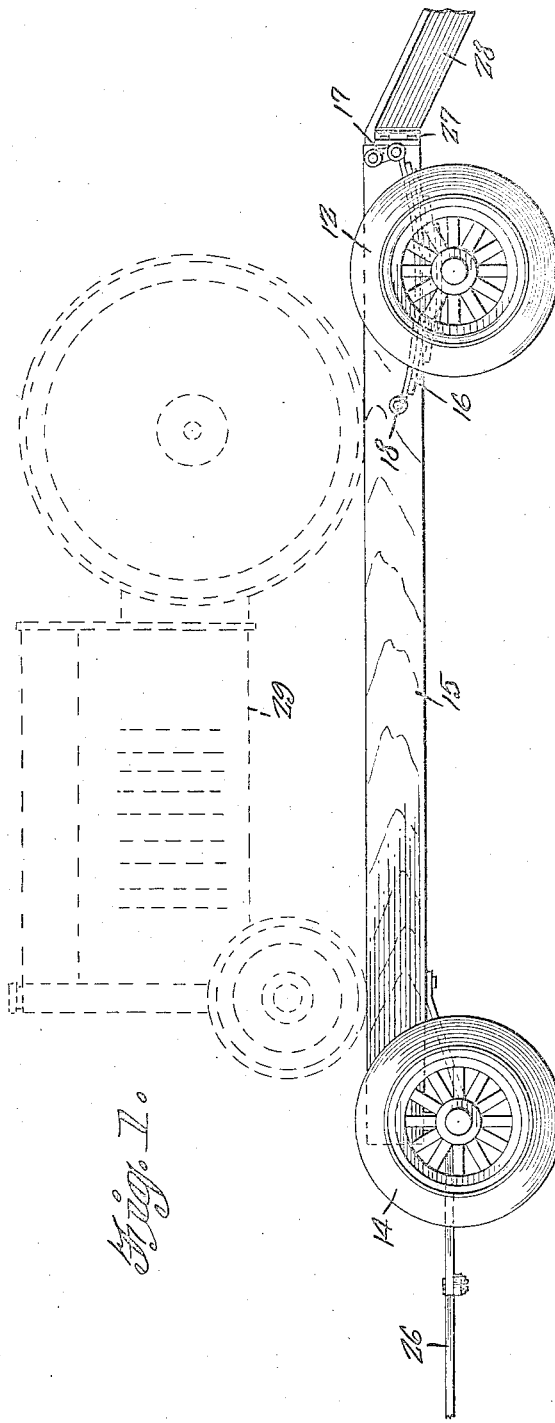
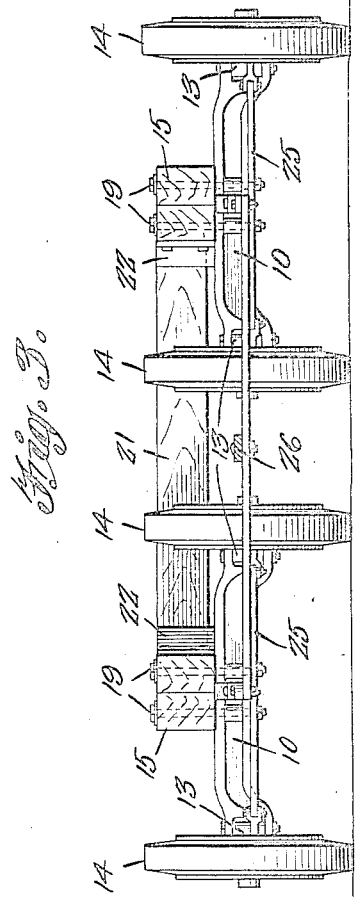
Even Ose, INVENTOR
BY Victor J. Evans & Co.
ATTORNEY
WITNESS:

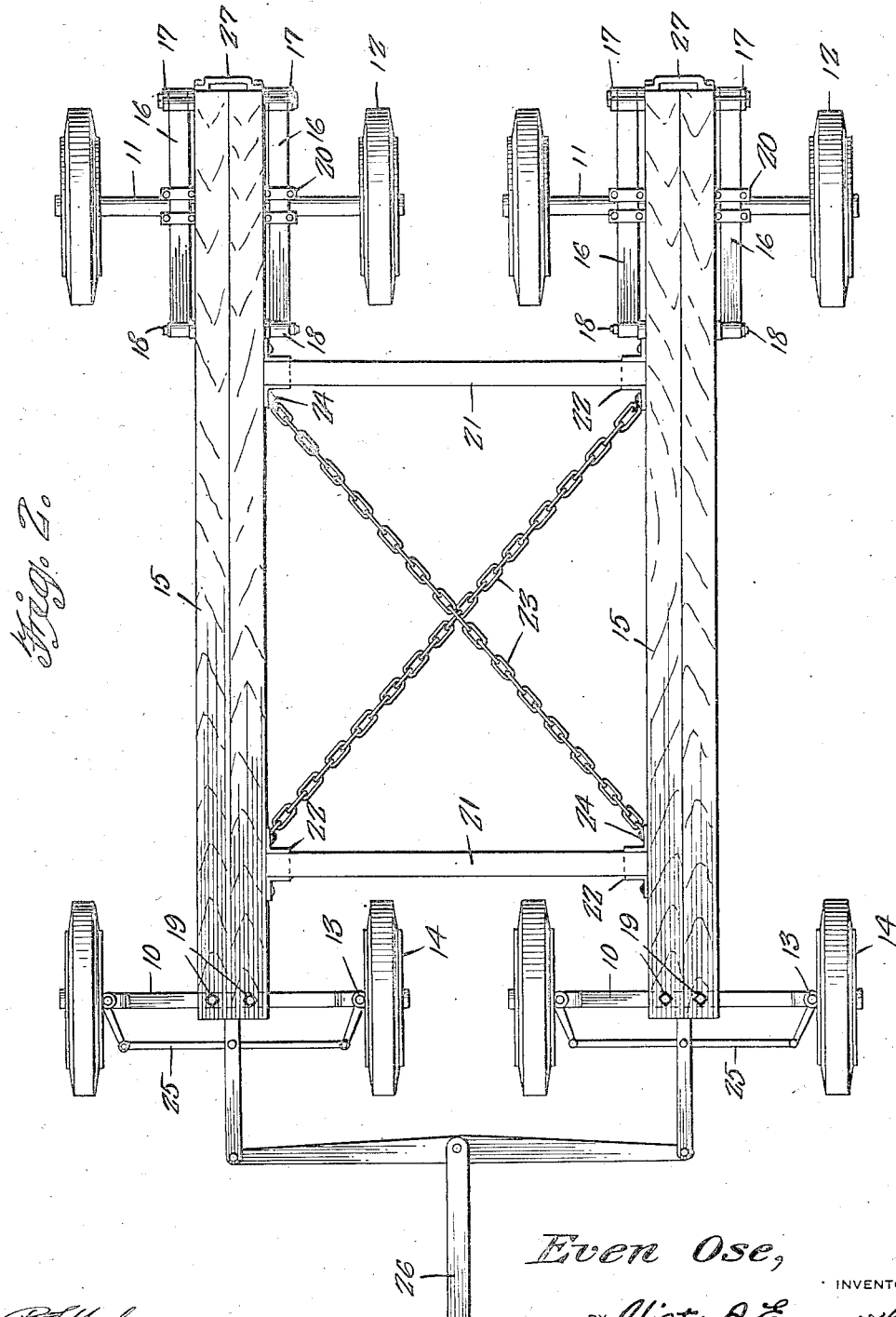

June 30, 1936. E. OSE 2,046,206
TRAILER
Filed May 21, 1934 4 Sheets-Sheet 3
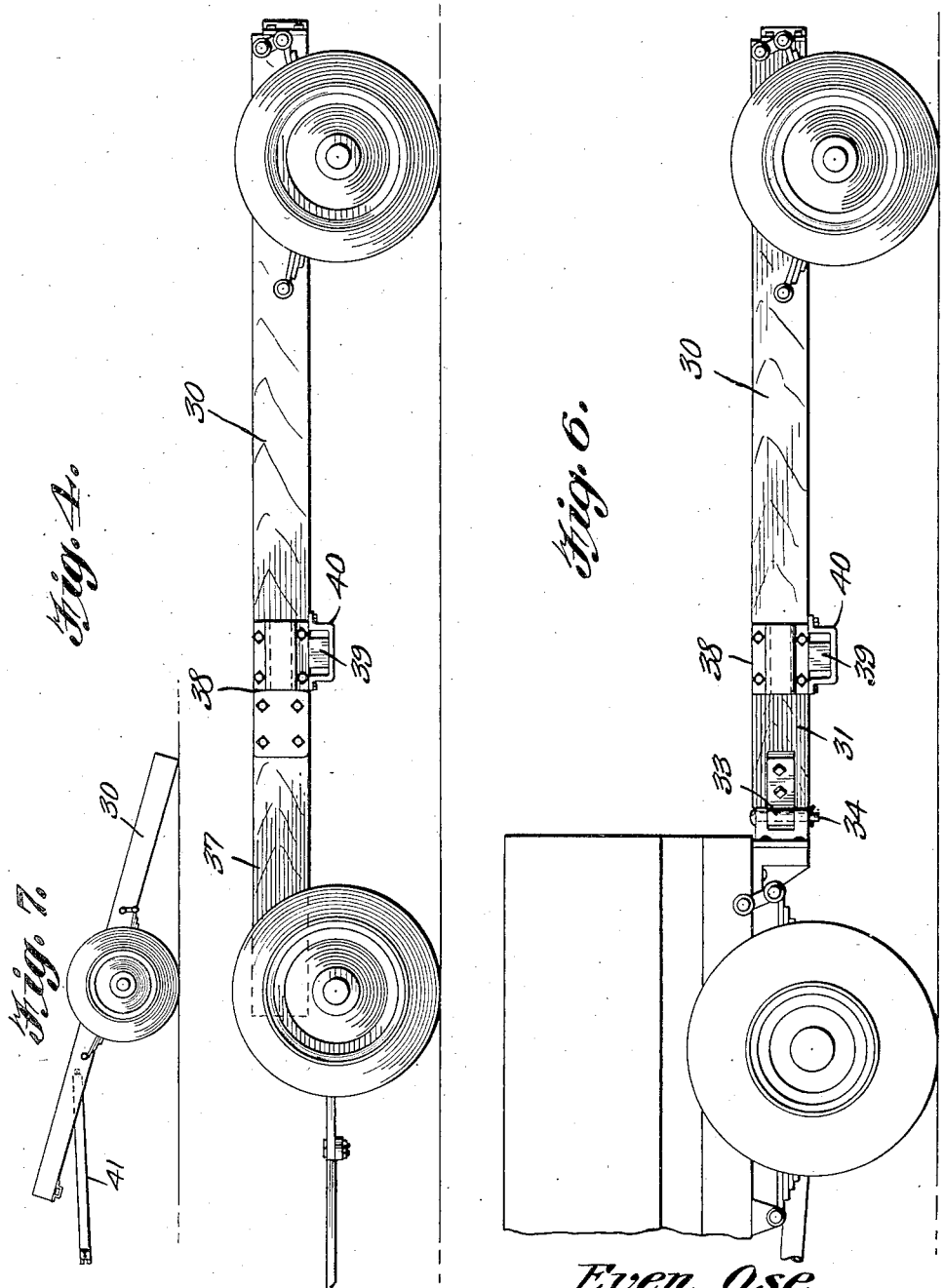

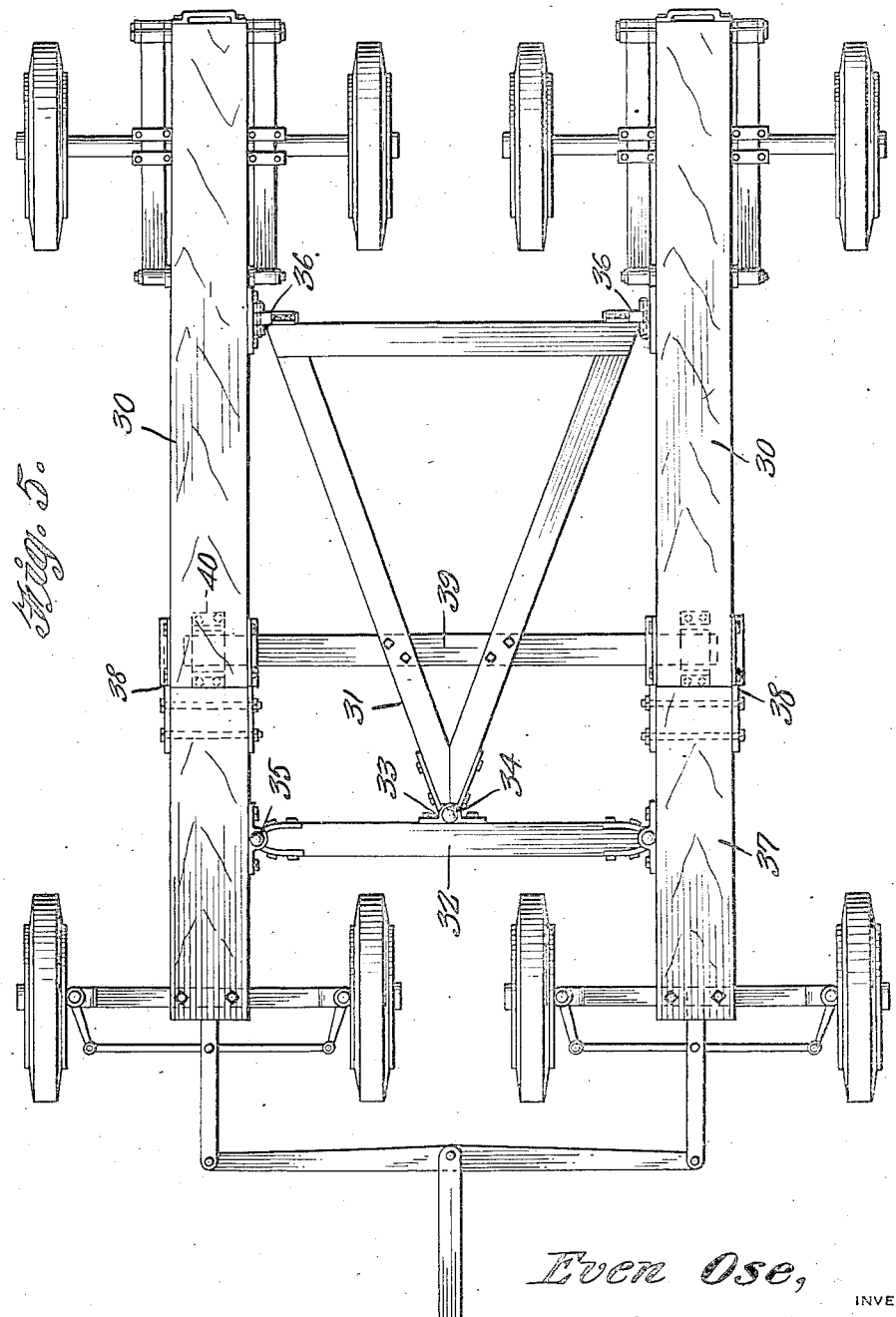

Patented June 30, 1936

2,046,206

UNITED STATES PATENT OFFICE 2,046,206

TRAILER

Even Ose, Thief River Falls, Minn.

Application May 21, 1934, Serial No. 726,827

3 Claims. (Cl. 280—81)

The invention relates to a trailer and more particularly to a wheeled vehicle used for hauling tractors and other heavy machines.

The primary object of the invention is the provision of a trailer of this character wherein, through the use of cross pieces, the frame can be widened in conformity with the requirement of a load.

Another object of the invention is the provision of a trailer of this character which is simple in construction, thoroughly reliable and efficient in its purposes, light in weight yet strong, sturdy and durable, and also inexpensive to manufacture.

With these and other objects in view, the invention consists in the features of construction, combination and arrangement of parts as will be hereinafter more fully described in detail, illustrated in the accompanying drawings, which disclose the preferred embodiments of the invention, and pointed out in the claims hereunto appended.

In the accompanying drawings:

Figure 1 is a side elevation of a trailer constructed in accordance with the invention.

Figure 2 is a top plan view thereof.

Figure 3 is a front elevation.

Figure 4 is a top plan view of a modified form.

Figure 5 is a side elevation thereof.

Figure 6 is a side elevation showing the truck hitched to a tractor.

Figure 7 is a side elevation of the trailer, this being the two double wheel trailer or the four wheel trailer.

Similar reference characters indicate corresponding parts throughout the several views in the drawings.

Referring to the drawings in detail, the trailer in its construction comprises a pair of front stationary axles 10, these being arranged end to end, and a pair of rear axles 11, likewise these being arranged end to end and having journaled thereon the rear wheels 12, there being four in number. The front axles 10 are fitted with turning knuckles 13, these supporting the front steering wheels 14, there being four in number.

Arranged over the axles 10 and 11 are pairs of sills 15, the sills of each pair being parallel with each other and in side by side contact one with the other. Each pair of sills 15, at their rear end portions, are supported upon bowed rear springs 16, each at its rear end connected to the said sills by a shackle 17 and at its front end by a pivot pin 18. The front portions of each pair of sills 15 are secured to the stationary front axle by coupling bolts 19, the springs 16 being joined to the rear axles 11 through the medium of clips 20.

Arranged transversely between the sills are the cross beams or bars 21, these being removably seated in saddle pieces 22 fixed to the innermost sills 15 of the pairs and these beams or bars 21 can be of any required length uniform with each other to give the proper width to the trailer in conformity with the load to be carried thereby.

Disposed between the pairs of sills 15 and the beams or bars 21 are crossed chains 23, their ends being made secure to the saddles 22, as at 24, and these chains prevent the spreading of the pairs of sills 15 with respect to each other and avoid the accidental detachment of the beams or bars 21 from the saddles 22, the pairs of sills and the beams or bars constituting the body or truck portion of the trailer.

The turning knuckles 13 connected with each axle 10 operate in unison through the medium of a tie or connecting rod 25, while operating both of said rods 25 in unison is a hitch 26 for the coupling of the trailer to a power medium.

At the rear ends of the pairs of sills 15 are socket fittings 27 for the detachable engagement therein of rearwardly inclined runway planks 28 so that a tractor, as illustrated at 29, or other heavy machinery, when upon the ground can be run onto the trailer for the transportation of said tractor or other heavy machine, as will be apparent.

The trailer in its construction really embraces a pair of four-wheel trucks, these being coupled together transversely with respect to each other and the front steering wheels of both trucks being guided by a hitch.

In Figures 4, 5 and 6 of the drawings there is shown a modification of the invention, wherein the sills 30, which are the equivalent of the sills 15, have arranged therebetween the triangular-shaped member 31, its tapered end being foremost and joined with a cross piece 32 through the medium of a clevis 33 having a removable pin 34, so that the fore end of the triangular member can be detached from this bar 32, the latter being linked, at 35, to the sills 30. The triangular-shaped member 31 and the cross piece at its rearmost end has connection with the sills 30 by hinges 36 and these sills 30 have separable front end portions 37 detachably coupled, at 38, with the rear portions of said sills. The hinges 36 are of the double hinge type, so that the body can swing sidewise or move up and down. The triangular-shaped member 31, at its underside, has fixed thereto a cross rest bar 39, the same having its opposite ends freely received in yokes or saddles 40, on the undersides of the sills 30. This cross piece 39 is fixed with the triangular-shaped member 31 to lie slightly rearwardly of the points of separation of the fore portions 37 of the wheels 30 from the rear portions thereof. It should be apparent that the fore portions 37 of the sills 30 which are supported by the front wheels of the trailer can be separated from the rear portions of said sills 30 by removing the clevis pin 34 and disconnecting the couplings 38, whereupon the front end of the triangular-shaped member 31 can be hitched to a draft medium and thereby converting the trailer from the front wheeled type to the rear wheeled type, as the double pairs of rear wheels will be the sole traction for the said converted trailer. It will be apparent that when the trailer has been converted, the sills 30, that is, the rear portions separated from the fore portions, will rest directly upon the cross bar 39 carried by the triangular-shaped member 31, to be maintained in substantially the same plane with each other. This converted trailer functions for the hauling of tractors or other heavy or light machinery. The triangular 31 and its cross pieces 32 and 39 may be readily removed from the sills by withdrawing the pintles for the hinges 35 and 36 and by sliding the cross piece 39 out of the saddles 40 and thus render the sills independent of each other.

In Figure 7 of the drawings there is shown the trailer which is of the two double wheel type, or what might be called a four-wheel trailer, having the sills 30 and the hitch 41.

The use of the trailer for the purposes stated should be clearly obvious and for this reason a more extended explanation is omitted.

What is claimed is:

1. A trailer of the character described comprising a pair of sills arranged side by side in spaced parallel relation to each other and each having front and rear axles and wheels supported by said axles, means located between the sills for sustaining the same in their spaced side by side relation to each other, said means comprising spaced front and rear cross members, and means on the confronting faces of the sills for removably pivoting said members to said sills for separation therefrom to render the sills independent of each other.

2. A trailer of the character described comprising a pair of sills arranged side by side in spaced parallel relation to each other and each having front and rear axles and wheels supported by said axles, means located between the sills for sustaining the same in their spaced side by side relation to each other, said means comprising spaced front and rear cross members, angle members having their outer ends fixedly secured to each other and their spread end fixedly secured to the rear cross member, means removably pivoting the pointed end of the angle members to the front cross member, a cross bar fixed to the angle members and, saddles carried by the sills in which the ends of the cross bar are freely received.

3. A trailer of the character described comprising a pair of sills arranged side by side in spaced parallel relation to each other and each having front and rear axles and wheels supported by said axles, means located between the sills for sustaining the same in their spaced side by side relation to each other, said means comprising a triangular member, means removably hinging the widened portion of said triangular member to the confronting sides of the sills, a cross member, means removably hinging the apex of the triangular member to the cross member, means removably hinging the ends of the cross member to the confronting sides of the sills, a cross beam fixed to the triangular member, and saddles depending from the sills through which the ends of the cross beam freely pass.

EVEN OSE.